US010385177B2

(12) United States Patent
Keske et al.

(10) Patent No.: US 10,385,177 B2
(45) Date of Patent: Aug. 20, 2019

(54) REACTIVITY DRIFT AND CATALYST DEGRADATION IN POLYURETHANE FOAM

(75) Inventors: David G. Keske, Glencoe, MO (US); David L. Modray, Kirkwood, MO (US); Mark S. Schulte, Moline Acres, MO (US); Timothy T. Kalinowski, St. Charles, MO (US)

(73) Assignee: Foam Supplies, Inc., Earth City, MO (US)

( * ) Notice: Subject to any disclaimer, the term of this patent is extended or adjusted under 35 U.S.C. 154(b) by 610 days.

(21) Appl. No.: 11/195,983

(22) Filed: Aug. 3, 2005

(65) Prior Publication Data
US 2006/0030633 A1    Feb. 9, 2006

Related U.S. Application Data

(60) Provisional application No. 60/598,693, filed on Aug. 4, 2004.

(51) Int. Cl.
| *C08J 9/14* | (2006.01) |
| *C08G 18/08* | (2006.01) |
| *C08G 18/18* | (2006.01) |
| *C08G 18/48* | (2006.01) |
| *C08G 101/00* | (2006.01) |

(52) U.S. Cl.
CPC ............ *C08J 9/142* (2013.01); *C08G 18/089* (2013.01); *C08G 18/18* (2013.01); *C08G 18/1875* (2013.01); *C08G 18/482* (2013.01); *C08G 2101/00* (2013.01); *C08J 2375/04* (2013.01)

(58) Field of Classification Search
CPC .. C08J 9/08; C08J 9/142; C08G 18/18; C08G 18/1875; C08G 18/222; C08G 18/227; C08G 18/24; C08G 18/26; C08G 18/3203; C08G 18/482; C08G 18/4833; C08G 18/4845; C08G 18/485; C08G 2101/0025
USPC ............... 516/19; 502/150, 155; 252/182.28, 252/182.26; 521/130, 164, 167, 170, 172, 521/173, 174
See application file for complete search history.

(56) References Cited

U.S. PATENT DOCUMENTS

| 2,834,748 | A | | 5/1958 | Bailey et al. |
| 3,432,470 | A | | 3/1969 | Portatius |
| 3,879,315 | A | | 4/1975 | Watkiinson et al. |
| 4,040,992 | A | | 8/1977 | Bechara et al. |
| 4,165,412 | A | | 8/1979 | Bechara et al. |
| 4,204,062 | A | | 5/1980 | Bechara et al. |
| 4,223,139 | A | | 9/1980 | Bechara et al. |
| 4,232,152 | A | | 11/1980 | Bechara et al. |
| 4,417,002 | A | * | 11/1983 | Liessem ......................... 521/128 |
| 4,425,446 | A | | 1/1984 | Malwitz et al. |
| 4,448,951 | A | | 5/1984 | Rupert et al. |
| 4,456,696 | A | | 6/1984 | Arbir et al. |
| 4,582,861 | A | | 4/1986 | Galla et al. |
| 4,617,286 | A | | 10/1986 | Arai et al. |
| 4,701,474 | A | | 10/1987 | Bailey, Jr. et al. |
| 4,758,605 | A | | 7/1988 | Williams |
| 4,785,025 | A | | 11/1988 | Galla et al. |
| RE33,054 | E | | 9/1989 | Markham |
| 4,972,003 | A | | 11/1990 | Grunbauer et al. |
| 4,997,858 | A | | 3/1991 | Jourquin et al. |
| 5,032,623 | A | | 7/1991 | Keske et al. |
| 5,112,878 | A | | 5/1992 | Margitich et al. |
| 5,117,117 | A | | 5/1992 | Oae et al. |
| 5,166,182 | A | | 11/1992 | Blampied |
| 5,168,009 | A | | 12/1992 | Petrella et al. |
| 5,173,516 | A | | 12/1992 | Vratsanos |
| 5,183,583 | A | | 2/1993 | Margitich et al. |
| 5,194,175 | A | | 3/1993 | Keske et al. |
| 5,252,625 | A | | 10/1993 | McLaughlin et al. |
| 5,254,600 | A | | 10/1993 | Blanpied et al. |
| 5,274,007 | A | | 12/1993 | Keske et al. |
| 5,283,003 | A | | 2/1994 | Chen |
| 5,294,647 | A | | 3/1994 | Blanpied et al. |
| 5,304,578 | A | | 4/1994 | Tamano et al. |
| 5,322,940 | A | | 6/1994 | Savoca et al. |
| 5,336,696 | A | | 8/1994 | Ashida |
| 5,356,942 | A | | 10/1994 | Savoca et al. |
| 5,367,045 | A | | 11/1994 | Takimoto et al. |
| 5,405,885 | A | | 4/1995 | Sampara et al. |
| 5,424,338 | A | | 6/1995 | Krueger |
| 5,451,615 | A | | 9/1995 | Birch |
| 5,453,455 | A | | 9/1995 | Krueger et al. |
| 5,478,494 | A | | 12/1995 | Lee et al. |

(Continued)

FOREIGN PATENT DOCUMENTS

| DE | 2822819 | 12/1978 |
| DE | 3428319 | 2/1986 |

(Continued)

OTHER PUBLICATIONS

Diblitz et al., "Influence of Acids on the Delayed-Action Characteristics of Amine Catalysts," Polyurethanes World Congress, 1993, pp. 619-624.
Keimling et al., "Low VOC Values—Special Catalysts for Polyurethane Moulded Foam," translated from Kunststoffe, 2000, pp. 99-102, vol. 90.
Letts et al., "Non-Corrosive, High Performance, Delayed Action Catalyst," Journal of Cellular Plastics, 1992, pp. 66-85, vol. 28.
European Search Report dated Apr. 2, 2009, in the related application No. 05785672.
Canadian Office Action dated Feb. 27, 2012 in related Application No. 25759613, 4 pages.

(Continued)

*Primary Examiner* — John M Cooney
(74) *Attorney, Agent, or Firm* — Ann-Louise Kerner; Lathrop Gage LLP

(57) ABSTRACT

The invention is directed to methods of preparing compositions used to manufacture polyurethane foams. The invention provides methods for making compositions used to make polyurethane foams that include amine catalysts, but formulated such that catalytic potency is not diminished over time before the forming of a foam.

12 Claims, 1 Drawing Sheet

(56) References Cited

U.S. PATENT DOCUMENTS

| | | | |
|---|---|---|---|
| 5,488,072 A | 1/1996 | Green | |
| 5,489,618 A | 2/1996 | Gerkin | |
| 5,552,447 A | 9/1996 | Green et al. | |
| 5,631,319 A | 5/1997 | Reese et al. | |
| 5,670,553 A * | 9/1997 | Mackey | 521/128 |
| 5,686,500 A | 11/1997 | Fishback et al. | |
| 5,710,185 A | 1/1998 | Volkert et al. | |
| 5,731,361 A | 3/1998 | Horn et al. | |
| 5,733,945 A | 3/1998 | Simpson | |
| 5,760,099 A | 6/1998 | Horn et al. | |
| 5,762,822 A * | 6/1998 | Tucker | 252/182.2 |
| 5,770,635 A | 6/1998 | Lee et al. | |
| 5,786,401 A | 7/1998 | Inagaki et al. | |
| 5,789,533 A | 8/1998 | Fishback et al. | |
| 5,798,533 A | 8/1998 | Fishback et al. | |
| 5,801,210 A | 9/1998 | Radovich et al. | |
| 5,877,226 A | 3/1999 | Tsuda et al. | |
| 5,883,146 A | 3/1999 | Tucker | |
| 6,031,013 A | 2/2000 | Scherzer et al. | |
| 6,034,145 A | 3/2000 | Comet et al. | |
| 6,046,247 A | 4/2000 | Gluck et al. | |
| 6,100,308 A * | 8/2000 | Guettes et al. | 521/131 |
| 6,107,335 A | 8/2000 | Horn et al. | |
| 6,107,355 A * | 8/2000 | Horn et al. | 521/51 |
| 6,133,481 A | 10/2000 | Singh et al. | |
| 6,207,725 B1 | 3/2001 | Sieker et al. | |
| 6,307,102 B1 | 10/2001 | Tokumoto et al. | |
| 6,329,440 B2 * | 12/2001 | Scherzer et al. | 521/137 |
| 6,384,097 B1 | 5/2002 | Tokumoto et al. | |
| 6,384,177 B1 | 5/2002 | Tokumoto et al. | |
| 6,387,972 B1 | 5/2002 | Ghobary et al. | |
| 6,395,796 B1 | 5/2002 | Ghobary et al. | |
| 6,403,665 B1 | 6/2002 | Sieker et al. | |
| 6,410,609 B1 | 6/2002 | Taylor et al. | |
| 6,432,756 B1 | 7/2002 | Ghobary et al. | |
| 6,432,864 B1 | 8/2002 | Wendel et al. | |
| 6,525,107 B1 | 2/2003 | Fard-Aghaie et al. | |
| 6,660,781 B1 | 12/2003 | Ghobary et al. | |
| 6,669,835 B1 | 12/2003 | Honnick | |
| 6,699,916 B2 | 3/2004 | Lekovic et al. | |
| 6,753,357 B2 | 6/2004 | Kalinowski et al. | |
| 6,790,871 B1 | 9/2004 | Farkas et al. | |
| 6,803,390 B2 | 10/2004 | Lekovic et al. | |
| 2002/0123598 A1 | 9/2002 | Sieker et al. | |
| 2003/0114549 A1 * | 6/2003 | Kalinowski et al. | 521/99 |
| 2003/0144372 A1 | 7/2003 | Hiroyuki et al. | |
| 2003/0236415 A1 | 12/2003 | Blazecka et al. | |
| 2004/0029986 A1 | 12/2004 | Ghobary et al. | |
| 2013/0161014 A1 | 6/2013 | Pakenham et al. | |

FOREIGN PATENT DOCUMENTS

| | | |
|---|---|---|
| EP | 0355872 | 2/1990 |
| EP | 0705288 | 8/1997 |
| EP | 0982336 | 3/2000 |
| EP | 1117718 | 1/2003 |
| GB | 1534236 | 11/1978 |
| GB | 2232990 | 1/1991 |
| JP | 60006717 | 1/1985 |
| JP | 63295618 | 12/1988 |
| JP | 2041335 | 2/1990 |
| JP | 07030200 | 4/1995 |
| JP | 07097472 | 4/1995 |
| JP | 07084536 | 9/1995 |
| JP | 07228655 | 9/1995 |
| KR | 2000032568 | 6/2000 |
| WO | WO 81/00411 | 2/1981 |
| WO | WO1993013051 | 7/1993 |
| WO | 03/051097 | 6/2003 |

OTHER PUBLICATIONS

Indian first examination report dated Mar. 15, 2012 in related Application No. 877/DELNP/2007 filed Feb. 1, 2007, 2 pages.

Australian Office Action dated Apr. 14, 2010 in related Application No. 2005271693, 3 pages.

Chinese Office Action dated Feb. 20, 2009 in related Application No. 200580033808.9, in English, 7 pages.

Chinese Office Action dated Feb. 20, 2009 in related patent Application No. 200580033808.9, in Chinese, 4 pages.

International Search Report dated Aug. 1, 2006 in the related Application No. PCT/US05/27244, 1 page.

Japanese Office Action dated Sep. 27, 2011 in the related Application No. JP 2007524887, in Japanese, 4 pages.

Japanese Office Action dated Sep. 27, 2011 in the related Application No. JP 2007524887, in English, 5 pages.

Mexican Office Action dated Oct. 20, 2011 in the related Application No. MX/a/2007/001331, in Spanish, 3 pages.

Mexican Office Action dated Nov. 7, 2011 in the related Application No. MX/a/2007/001331, in English, 2 pages.

Vietnamese Office Action dated Feb. 19, 2009 in related Application No. 1-2007-00471, in English, 1 page.

Vietnamese Office Action dated Feb. 19, 2009 in related Application No. 1-2007-00471, in Vietnamese, 1 page.

Canadian Office Action dated Dec. 7, 2012 in corresponding Application No. CA 2,575,613, 3 pages.

Australian Office Action dated Jan. 11, 2013 in corresponding Application No. 2012200194, 4 pages.

* cited by examiner

REACTIVITY DRIFT AND CATALYST DEGRADATION IN POLYURETHANE FOAM

CROSS-REFERENCE TO RELATED APPLICATIONS

This application claims the benefit of priority of U.S. provisional application 60/598,693 filed Aug. 4, 2004, which application is incorporated herein by reference in its entirety.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Field of the Invention

The present invention relates to consistently manufacturing polyurethane foams prepared with agents that hydrolyze, creating acids that attack catalysts. For example, foams prepared with alkyl alkanoates.

I. Introduction

Polyurethane foams insulate, float, cushion, glue, clothe and absorb sound, among a plethora of other applications. Polyurethanes, defined as polymeric substances having multiple urethane linkages, are a large family of polymers with widely ranging properties and uses. The types and properties of polyurethanes are so varied that the Alliance for the Polyurethanes Industry (Arlington, Va.) has dubbed them the "erector set" of the plastics industry. Types of polyurethanes include rigid and flexible foams; thermoplastic polyurethane; and other miscellaneous types, such as coatings, adhesives, sealants and elastomers. Flexible foams (e.g., that found in most car seat cushions) are generally open-celled materials, while rigid foams (e.g., building insulation) usually have a high proportion of closed cells.

While rigid polyurethane foams are found in insulation in refrigeration systems, structural applications and flotation applications, transportation vehicles and metal doors, flexible polyurethane foams are used in automotive seats, headrests and armrests; in carpet padding, packaging, clothing, leather products, shoe uppers, tents, life rafts, labels, handbags and furniture cushions. Semi-flexible molded foams are found in automotive instrument panels, energy managing foam and sound absorbing foam.

A. Forming Polyurethane Foams: the Gel and Blow Reactions

Polyurethane foams are produced by reacting a di- or polyisocyanate (compound containing an isocyanate group (N=C=O attached to an organic radical)) with compounds containing two or more active hydrogens, generally in the presence of catalysts, silicone-based surfactants and other auxiliary agents. The active hydrogen-containing compounds are typically polyols (organic compounds having more than one hydroxyl (—OH) groups per molecule), primary and secondary polyamines and water. Two major reactions are promoted by the catalysts: the gel reaction and the blow reaction. Balance is needed between reaction of the isocyanate and the polyol (gel reaction) and the reaction of the isocyanate with water (blow reaction) in order to produce a polyurethane foam in which the cells are relatively uniform and the foam has specific properties depending on the anticipated application; for example, rigid foams, semi-rigid foams, and flexible foams. Foams can be formed by a one-shot method or by formation of a pre-polymer and subsequent reaction of the pre-polymer with water in the presence of a catalyst.

The gel reaction consists of the isocyanate reacting with the polyol or polyamine and leads to the formation of a polymer of high molecular weight. This reaction predominates in foams blown exclusively with low boiling point organic compounds. The blow reaction occurs between isocyanate and water. This reaction promotes polymer growth and blows carbon dioxide bubbles into the developing polyurethane mass. The blow reaction helps avoid, or reduces the use of, auxiliary blowing agents. The in situ generation of carbon dioxide by the blow reaction plays an essential role in the preparation of one-shot, water-blown polyurethane foams.

Examples of unbalanced gel and blow reactions include those foams in which carbon dioxide evolves too quickly, forming foams that tend to collapse. A gel reaction that proceeds too rapidly reduces foam-rise, resulting in a high density foam. In practice, the balancing of these two reactions is controlled by the nature of the promoters and catalysts, generally amine and/or organo-metallic (an organic molecule containing a metal atom). Frequently, a gelling catalyst and a blowing catalyst are used together to balance gelling and blowing.

B. Blowing Agents and Catalysts

Blowing agents traditionally include chlorofluorocarbons (CFCs). However, CFCs detrimentally affect the earth's ozone layer. To avoid the dangers of CFCs, some processes use hydrochlorofluorocarbons (HCFCs) instead. For example, some processes use monochlorodifluoromethane ($CHClF_2$) (Keske and Schulte, 1991; Keske and Schulte, 1993a; Keske and Schulte, 1993b). However, even HCFCs also carry important environmental risks, even though they are less harmful than CFCs.

Until recently, using alkyl alkanoates, including methyl formate, as an alternative sole blowing agent were unsatisfactory. Such foams shrink more than 10% after manufacture. Methyl formate as a blowing agent can produce stable foams if used with other blowing agents—such as the undesirable CFCs or HCFCs—produce dimensionally stable foams. However, using alkyl alkanoates alone—without any harmful CFCs or HCFCs—has recently been accomplished (Kalinowski et al., 2004).

Catalysts generally fall into two categories: tertiary amines (mono- and poly-) and organo-metallic compounds. Organo-metallic catalysts favor the gel reaction, while amine catalysts favor the blow or gel reactions depending on the catalyst. Using metal catalysts in flexible foam formulations also increases the number of closed cells, creating tighter foams. Tertiary amines also are effective as catalysts for the chain extension reaction and can be used in combination with organo-metallic catalysts. For example, in the preparation of flexible slabstock foams, the one-shot process uses triethylenediamine to promote the blow reaction and the cross-linking reaction, while an organo-metallic compound synergistically promotes the chain extension reaction.

C. The Foam-blowing Process

The process for making foams typically involves the mixing of the starting materials with polyurethane foam production machinery and pouring the reacting mixture, as it exits the mix-head, into a mold. To prepare foams, a first component (component A or "A-side"), supplying isocyanate, is mixed with a second component (component B or "B-side"), supplying the polyol and usually a catalyst. Component A can also provide a surfactant and a blowing agent. Component B can also supply a surfactant and a blowing agent. The optional constituents of the sides, as well as the catalyst, can be alternatively introduced by a third stream.

D. Obstacles to Manufacturing Consistent Polyurethane Foams

Until recently, blowing agents were CFCs, HCFCs and hydrofluorocarbons (HFCs); however, these have many undesirable characteristics, especially as related to environmental concerns. Alkyl alkanoates can be used as effective substitutes, or with other blowing agents (Kalinowski et al., 2004). However, when using an alkyl alkanoate as a blowing agent, alone or with CFCs, HCFCs, HFCs, hydrocarbons or hydrofluoroethers (HFEs) in the presence of water, the blowing agent can hydrolyze. Other foam ingredients can hydrolyze in the presence of water as well, notably polyester polyols. This hydrolysis results in the formation of acids that attack the amine catalyst, causing the catalyst's reactivity to deteriorate. The consequence is that the reactivity of the foam slows. This fluctuation interferes with consistent, efficient and reproducible foam production and can have a deleterious effect on the properties or suitability of the resultant foam.

Traditionally, delayed action catalysts, which are acid-blocked amines, such as simple amine salts of a tertiary amine and a carboxylic acid (such as formic, acetic or 2-ethylhexanoic acid) were used to counter this problem, but these are expensive and the choices of such catalysts is limited. The foam industry is plagued by imperfections in the manufacturing process, most notably by hydrolysis of certain ingredients which target a single acid-vulnerable molecule: the amine catalyst.

SUMMARY OF THE INVENTION

Figure 1A:
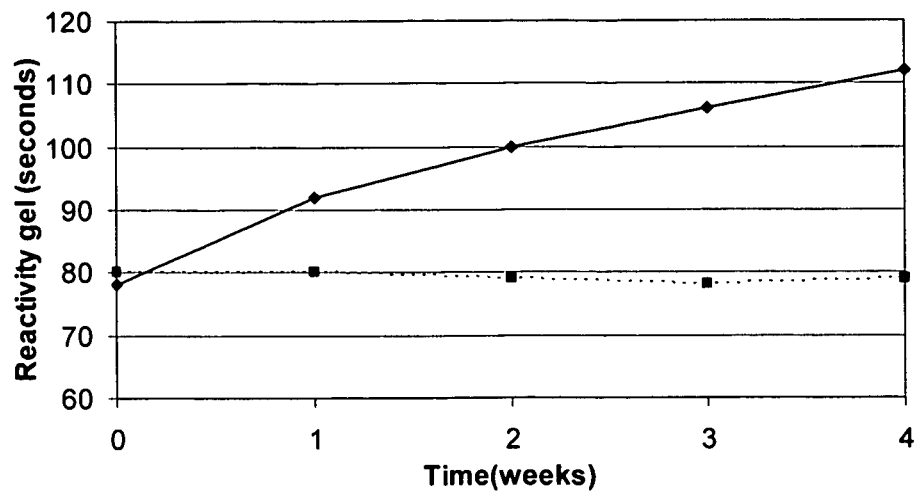
FIG. 1a shows the protective effect the methods of the invention have on retaining catalyst activity in the formation of polyurethane foams. The reactivity of the gel after formulation is plotted.

Accordingly, it is an object of the invention to overcome these and other problems associated with hydrolyzable ingredients.

In a first aspect, the invention provides methods of preparing components used to make polyurethane foams, where at least one blowing agent is combined with at least one catalyst and at least one acid, wherein the at least one blowing agent is other than water, such that the activity of the catalyst does not substantially deteriorate over time. The blowing agent can be an alkyl alkanoate, such as methyl formate; the catalyst can be an amine catalyst, and the acid can be an organic acid, such as formic acid.

In a second aspect, the invention provides methods of stabilizing/retaining activity of catalysts used in polyurethane foam production, where at least one blowing agent is combined with at least one catalyst and at least one acid, wherein the at least one blowing agent is other than water, such that the activity of the catalyst does not substantially deteriorate over time. The blowing agent can be an alkyl alkanoate, such as methyl formate; the catalyst can be an amine catalyst, and the acid can be an organic acid, such as formic acid.

In yet a third aspect, the invention provides compositions suitable for preparing polyurethane foams, such that the activity of a catalyst in the composition remains stable over time. In such compositions, at least one blowing agent is combined with at least one catalyst and at least one acid, wherein the at least one blowing agent is other than water, such that the activity of the catalyst does not substantially deteriorate over time. The blowing agent can be an alkyl alkanoate, such as methyl formate; the catalyst can be an amine catalyst, and the acid can be an organic acid, such as formic acid.

In a fourth aspect, the invention provides polyurethane foams manufactured from compositions wherein the activity of a catalyst remains stable over time. In such foams, at least one blowing agent is combined with at least one catalyst and at least one acid, wherein the at least one blowing agent is other than water, such that the activity of the catalyst does not substantially deteriorate over time, and then mixed with a polyol-containing composition. The blowing agent can be an alkyl-alkanoate, such as methyl formate; the catalyst can be an amine catalyst, and the acid can be an organic acid, such as formic acid.

In all aspects of the invention, the acid can be present, by weight, from 1% to 500% of the molar equivalent of the amine catalyst.

These and other features, aspects and advantages will become better understood with reference to the following description, examples and appended claims.

DETAILED DESCRIPTION OF THE INVENTION

The problems of the imperfect amine catalyst that produces foams that are too tight (as when most blocked catalysts are used) or falls prey to acid attack such that catalyst activity deteriorates, is solved by the present invention using a simple and inexpensive method. The addition of an acid to the polyol blend (component B), surprisingly and unexpectedly, eliminates the degradation of amine catalysts. The acid is added at a concentration (by weight) of about 1% to about 500% of the molar equivalent of the amine catalyst(s); preferably from about 10% to about 400% of the molar equivalent of the amine catalyst(s); more preferably from about 50% to about 300% of the molar equivalent of the amine catalyst(s). In a most preferred embodiment, formic acid is added to component B, wherein the blowing agent in the system is methyl formate.

II. Practicing the Invention

A. Component A

1. Isocyanates

When manufacturing a foam from components A and B, component A contains an isocyanate, or mixtures and combinations of discrete isocyanates, and preferably also a surfactant. The isocyanate can be any of the isocyanates, organic or inorganic, conventionally used in the production of polyurethane foams. Such polyisocyanates are commonly used in the preparation of polyurethanes by reaction with compounds containing two or more active hydrogen-containing groups. Any of the polyfunctional isocyanates, such as isophorone diisocyanate, polymeric methylenebis (phenyl isocyanate), 2,6-tolulene diisocyanate, 4,4'-methylenebis (phenyl isocyanate), dianisidine diisocyanate, tolidine diisocyanate, hexamethylene diisocyanate, m-xylene diisocyanate, 1,5-napthalene diisocyanate, p-phenylene diisocyanate 1,5-napthalene diisocyanate, p-phenylene diisocyanate, 1,4-di-ethylbenzene diisocyanate, polymethylenepolyphenyl isocyane, 3,3-diphenyldimethylmethane-4,4-di isocyanate, xylylene diisocyanates, xylyl diisocynates, 2,4-toluenediisocyante dimer, m-phenylenedi isocyante, toluene di isocynates, diphenylmethane-2,4-di isocyanate, etc. Mixtures of two or more isocyanates can be used, such as mixtures of the 2,4- and 2,6-isomers of tolulene diisocyanate or 2,4'- and 4,4'-isomers of methylenebis(phenyl isocyanate). Modified forms of 4,4'-methylenebis (phenyl isocyanate) or mixtures of the 2,4'-isomer and 4,4'-isomer thereof can also be used.

2. Blowing Agents

In addition, component A can contain a blowing agent, although including such an agent in component A is unnecessary. In one embodiment, the blowing agent is an alkyl alkanoate, with methyl formate being preferred. Derivatives and precursors of a selected alkyl alkanoate can also be used, either alone or with methyl formate.

A "derivative and/or precursor" of alkyl alkanoate is any composition in which the alkyl alkanoate is attached to an inert carrier with respect to the remaining ingredients of components A and B. The derivative and/or precursor of the alkyl alkanoate maintain the functionality of the alkyl alkanoate. If an alkyl alkanoate derivative and/or precursor are used, it is a complex that maintains the entire structure as a moiety of the complex. A "precursor" is a composition that produces an alkyl alkanoate at some point prior to, or during, the foaming process.

Other blowing agents can be present in addition to alkyl alkanoates. For example, CFCs, HCFCs, HFCs, methylene chloride, hydrofluorocarbons, hydrocarbons or other organic compounds can also be used. Water itself is a blowing agent and is almost always present in at least residual quantities. The addition of an acid (or blend) to the polyol blend (component B), surprisingly and unexpectedly, reduces or eliminates the further degradation of amine catalysts. The acid (or blend) is added at from about 1% to about 500% of the molar equivalent of the amine catalyst(s); preferably from about 10% to about 400% of the molar equivalent of the amine catalyst(s); more preferably from about 50% to about 300% of the molar equivalent of the amine catalyst(s). The materials of component A can be blended in any standard manner. The order of blending is not particularly significant. Nevertheless, a convenient order of mixing is to add surfactant to isocyanate, and then to add the acid inhibitor, if any, and finally to add the blowing agent(s), if any.

The relative proportions of ingredients should be such that if component A contains one or more blowing agents, the concentration of blowing agent(s) in component A is from about 0.5% by weight to about 12% by weight, preferably about 2% by weight to about 10% by weight. The alkyl alkanoate (and/or derivative and/or precursor thereof) itself can make up as much as about 12% by weight, preferably as much as about 10% by weight, such as from about 2% by weight to about 10% by weight, of component A. The surfactant can make up less than about 2% by weight, preferably about 0.75% by weight, of component A. If an acid inhibitor is desired, it can be included in a concentration of up to about 0.5% by weight, based on the weight of component A. Typically, the balance of component A is the isocyanate.

3. Surfactants and Miscellaneous Agents

Any conventional, A-side surfactant can be incorporated into component A. Examples of such surfactants include silicones, such as B-8407, DC-5160, DC-198, DC-5125, DC-1315 and B-8021 (Degussa/Goldschmidt Chemical Corp.; Mapleton, Ill.); L-620 (Union Carbide; Houston, Tex.); L-6202 and Y-10390 (Air Products; Allentown, Pa.), other silicones and siloxaneoxyalkylene block copolymers (Bailey and O'Connor, 1958; Ferrigno, 1963). The surfactant choice, while not essential to the present invention, affects the cell structure in the produced foam.

Other compositions, such as fire retardants, for example, those containing bromine, chlorine or phosphorus, can also be included in the component A. Because the fire retardant industry continues to be in constant flux, the available chemicals and chemical families are also in flux. However, any fire retardant that is appropriate for use in traditionally blown foams are appropriate for use in the foams of the invention.

B. Component B

1. Polyol

Component B contains at least one polyol. Component B typically consists of 50% polyol(s) (by weight) to about 98% (by weight), preferably 70% (by weight) to about 92% (by weight) of at least one polyol.

When using methyl formate in component B, at least one of the polyol(s) in component B is a polyalkoxylated amine, a polyalkoxylated ether or a polyester polyol and has a hydroxyl number of from about 20 to about 1000. Preferably, the hydroxyl number is from about 20 to about 750, most preferably about 300 to about 500 for rigid foams and most preferably 20-100 flexible foams. However, the preferred hydroxyl ranges are determined solely by the desired end product. The skilled artisan can determine the appropriate hydroxyl number. The polyalkoxylated polyols preferably are polyethoxylated, polypropoxylated, or polybutoxylated, or mixtures thereof. The polyalkoxylated amine can be, for example, a polyalkoxylated aliphatic amine or a Mannich polyol; the polyalkoxylated ether can be, for example, a polyalkoxylated sucrose or glycerin; and the polyester polyol can be a transesterification of a terephthalate or castor oil. The polyols can be made individually or as coinitiators.

One or more of any one of the three classes of polyols, or any combination of polyols from any two or all three of the classes, can be used in component B. Component B can contain other polyols as well; preferably, the total of all polyols present from the three classes (that is, the total of all polyols from any of the polyalkoxylated amines, polyalkoxylated ethers and polyester polyols) make up more than about 50% by weight of all the polyols of component B, and at least about 50% by weight of component B.

Other useful polyhydric compounds, whether or not an alkyl alkanoate is used as a blowing agent and in addition to those listed above, include ethylene glycol, propylene glycol, diethylene glycol, dipropylene glycol, glycerol, pentaerythritol, sorbitol, sucrose, methyl glucoside, glucose, etc. Polyamine compounds that can be reacted with alkylene oxide to prepare amine-based polyols include mono-, di-, and trietha-nol amine, ethylene diamine, diethylene diamine, toluene diamine, etc. These polyhydric alcohols and polyamine compounds can be reacted separately with alkylene oxides, or they can be pre-mixed in the preparation of polyether polyol mixtures or blends. Preferred polyester polyols are those based on terephthalic, phthalic, isophthalic, adipic, succinic, glutaric, fumaric acid(s), and combinations thereof.

2. Acids

In those compositions in which a blowing agent can hydrolyze or otherwise deteriorate, such that a catalyst in the mixture is attacked with consequent reduction in catalytic activity, an acid is added to the mix to protect the susceptible catalyst. Any organic acid or inorganic acid that protects the amine catalyst from acids generated by the hydrolysis of a blowing agent or other ingredients of component B can be used. Protection consists of maintaining a constancy of the reaction rate that permits the continued manufacture of the final product without a detrimental change in the performance. Any acid that functions to protect the amine catalyst from acid attack is suitable for use. In general, appropriate acids have a $pK_a$ greater than 0; more preferably 0-10; and more preferably 0-5. Preferably the acid is organic. Table 1 lists some examples of suitable acids.

TABLE 1

Examples of suitable acids

| Acid | $pK_a$ | Acid | $pK_a$ |
|---|---|---|---|
| Diethylmalonic acid | 7.20 | trifluoromethanesulfonic acid | 13 |
| Formic acid | 3.75 | benzenesulfonic acid | 2.5 |
| Glycylglycine | 8.40 | methanesulfonic acid | 2.0 |
| N-2-hydroxyethylpiperazine-N'-2-ethane-sulphonic acid | 7.55 | trifluoroacetic acid | 0.0 |
| | | picric acid | 0.3 |
| N-2-hydroxyethylpiperazine-N'-3-propane-sulphonic acid | 8.00 | squaric acid | 1.5 |
| | | trichloroacetic acid | 0.77 |
| Imidazole | 7.00 | oxalic acid | 1.2 |
| 2-(N-morpholino) ethanesulphonic acid | 6.15 | dichloroacetic acid | 1.25 |
| | | fluoroacetic acid | 2.6 |
| 3-(N-morpholino) propanesulphonic acid | 7.20 | chloroacetic acid | 2.87 |
| | | citric acid | 3.13 |
| piperazine-N-N'-bis (2-ethanesulphonic acid) | 6.80 | formic acid | 3.75 |
| | | ascorbic acid | 4.17 |
| Phenol | 9.99 | benzoic acid | 4.20 |
| o-Phosphoric acid (1) | 2.12 | acetic acid | 4.75 |
| o-Phosphoric acid (2) | 7.21 | thiophenol | 6.6 |
| piperazine-1,4-bis(2-hydroxypropanesulfonic acid) | 7.85 | tropolone | 6.7 |
| | | p-nitrophenol | 7.2 |
| Succinic acid (1) | 4.19 | peracetic acid | 8.2 |
| Succinic acid (2) | 5.57 | succinimide | 9.6 |
| 3-[tris (hydroxymethyl) methyl] amino propane-sulphonic acid | 8.40 | phenol | 10.0 |
| | | chloral hydrate | 10.0 |
| 2-[tris (hydroxymothyl) methyl] amino ethane-sulphonic acid | 7.50 | benzenesulfonamide | 10.1 |
| | | Dinitromethane | 3.6 |
| Tricine (N-[tris (hydroxymethyl) methy] glycine) | 8.15 | | |
| TRIS (tris (hydroxylmethyl) aminomethane) | 8.30 | | |
| malonaldehyde | 5.0 | | |
| Meldrum's acid | 5.1 | | |
| 2,4-pentanedione | 8.9 | | |
| hydrocyanic acid | 9.2 | | |
| nitromethane | 10.2 | | |
| 5,5-dimethyl-1,3-cyclohexadione | 4.8 | | |

For example, in foams where an alkyl alkanoate is used as a blowing agent with an amine catalyst, the blowing agent can hydrolyze and form an acid that attacks the catalyst. To prevent degradation in catalytic activity, an acid is added, such as formic acid, to at least about 1% to about 500% of the molar equivalent of the susceptible catalyst. Table 2 lists examples of amine catalysts.

TABLE 2

Examples of amine catalysts

| Class | Examples |
|---|---|
| N,N-dialkyl-piperazines trialkylamines | N,N-dimethylpiperazine, N,N-diethylpiperazine trimethylamine triethylamine tributylamine 1,4-diazabicyclo(2-2-2)octane (triethylene diamine) and the lower-alkyl derivatives thereof (e.g., 2-methyl triethylene diamine 2,3-dimethyl triethylene diamine 2,5-diethyl triethylene diamine 2,6-diisopropyl triethylene diamine) |
| N,N',N''-trialkyl-aminoalkyl-hexarihydrotriazines | N,N'N''-tris(dimethylaminomethyl)hexahydrotriazine N,N',N''-tris(dimethylaminoethyl)hexahydrotriazine N,N'N''-tris(dimethylaminopropyl)hexahydrotriazme N,N',N''-tris(diethylaminoethyl)hexahydrotriazine |
| mono-, di-, and tri-(dialkylaminoalkyl) monohydric phenols or thiophenols (e.g.,) | N,N'N''-tris(diethylaminopropyl)hexahydro-triazine 2-(dimethylaminomethyl)phenol 2-dimethylaminobutyl)phenol 2-(diethylaminoethyl)phenol 2-(diethylaminobutyl)phenol 2-(dimethylaminomethyl)thiophenol 2-(diethylaminoethyl)thiophenol 2,4-bis-(dimethylaminoethyl)phenol, 2,4-bis(dipropylaminobutyl)phenol 2,4-bis(dipropylaminoethyl)phenol 2,4-bis(dimethylaminoethyl)thiophenol, 2,4-bis(diethylaminopropyl)triophenol 2,4-bis(dipropylaminoethyl)thiophenol, 2,4,6-tris(dimethylaminoethyl)phenol 2,4,6-tris(diethylaminoethyl)phenol 2,4,6-tris(dipropylaminomethyl)phenol |

TABLE 2-continued

Examples of amine catalysts

| Class | Examples |
|---|---|
| | 2,4,6-tris(diethylaminoethyl)thiophenol |
| | 2,4,6-tris(dimethylaminoethyl)thiophenol |
| N,N,N'N'-tetraalkyl-alkylenediamines | N,N,N',N'-tetramethyl-1,3-propanediamine |
| | N,N,N',N'-tetramethyl-1,3-butanediamine |
| | N,N,N',N'-tetramethylethylenediamine |
| N,N-dialkylcyclohexyl-amines | N,N-dimethylcyclohexylamine, |
| | N,N-diethylcyclohexylamine |
| N-alkylmorpholines | N-methylmorpholine, |
| | N-ethylmorpholine |
| N,N-dialkyl-alkanolamines | N,N-dimethylethanolamine, |
| | N,N-diethylethanolamine, |
| N,N,N',N'-tetraalkylguanidines | N,N,N',N'-tetramethylguanidine, |
| | N,N,N',N'-tetraethylguanidine |

3. Blowing Agents

Lower levels of blowing agent than are usually found in comparable foams utilizing HCFC blowing agents can be used. For example, a preferred formulation is shown in Table 3.

TABLE 3

Example of a preferred formulation

| | Constitutent | % (by weight) |
|---|---|---|
| Component A | Isocyanate | 96.7 |
| | Surfactant | 1.3 |
| | Methyl formate | 2.0 |
| Component B | Polyalkoxylated ether | 4.5 |
| | Polyalkoxylated ether | 71.48 |
| | Polyalkoxylated amine | 10.0 |
| | Surfactant | 1.5 |
| | Catalyst 1 | 0.59 |
| | Catalyst 2 | 0.19 |
| | Catalyst 3 | 0.12 |
| | Diluent | 5.00 |
| | Water | 2.51 |
| | Methyl formate | 3.58 |
| | Formic acid | 0.48 |

Such a formulation of component B as presented in Table 3 results in a solution where the catalysts retain consistent activity over the life of the solution. This and other component B solutions formulated with an acid of the blowing agent retain consistent catalyst activity over time. For example, acceptable reactivity drifts are determined by the end-product and the specific application of the product. Preferably, the reactivity drift stays within acceptable ranges in excess of 1 week, more preferably, in excess of 6 months, most preferably, in excess of 2 years. Those of ordinary skill in the art of producing polyurethane foams can easily adjust the types and quantities of each polyol and the ratio of alkyl alkanoate to water in the formula such that the desired properties of the finished foam are achieved.

Water in component B can be from 0% to about 5%, preferably about 0.5% to about 4%, more preferably about 1% to about 3% (by weight). Water can serve as a blowing agent as well as add rigidity to the resulting foam.

The alkyl alkanoate in component B is preferably methyl formate and/or any derivative and/or precursor thereof. The alkyl alkanoate constitutes as much as about 15%, preferably about 2% to about 15% (by weight) of component B. The acid is present in a sufficient amount to retain the activity of any amine catalysts.

The alkyl alkanoate, as well as the acid, can be introduced by a separate stream in addition or in place of that which can be in either or both of components A and B. The concentrations of alkyl alkanoate in components A and B and the amount introduced to the reaction mixture by way of a separate stream are adjusted and coordinated so that the resulting concentration of total alkyl alkanoate (or derivative and/or precursor thereof) brought together upon mixing components A and B and separate streams, if any, based on the total weight of the resulting mixture, is from about 1% to about 12%, preferably from about 4% to about 8%. Other blowing agents can be used or at least be present. These include, for example, CFCs, HFCs, HCFCs, HFEs, hydrocarbons, other alkyl alkanoates, as well as any others known to the skilled artisan.

More preferably, the total amount of blowing agent present in each component and in the total combination of all ingredients mixed together to form a foaming mixture should be substantially free (less than 1% by weight) of CFCs, HCFCs, HFCs, HFEs and hydrocarbons; more preferably, no CFCs, HCFCs, HFCs, HFEs and hydrocarbons are present. The mixture to blow the foam is preferably also substantially free, more preferably, devoid, of any other substituted or unsubstituted hydrocarbon. Ideally, the foaming mixture is substantially free, more optimally devoid, of any other organic compound that acts as a blowing agent.

The polyols in the combination need not form a separate composition; it is unnecessary to mix the constituents of the mixture together to form a premix and then to form component B by mixing the premix with the remaining ingredients of component B. The ingredients of component B can be mixed in any order, and the polyols can be added separately from each other as separate ingredients to form component B.

5. Catalysts

In addition to the amine catalysts listed in Table 2, any organometallic compound known to be a catalyst in the reaction between an isocyanate group and an active hydrogen-containing group can be used as a catalyst. Such catalysts include, but not limited to, the organic acid salts of, and the organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium.

6. Other Agents

Component B can also contain other ingredients as desired. Optional additives such as dispersing agents, cell stabilizers, surfactants, flame retardants, and the like, that are commonly used in the fabrication of polymer foams can be used in the process of the invention. For example, phosphorus-based flame retardant additives can be used if flame retardancy is desired. A finer cell structure can be obtained if organo-silicone polymers are used as surfactants in the reaction mix.

Other optional additives, such as inorganic and organic fillers, can also be used. Examples of inorganic fillers include calcium carbonate, barium sulfate, silica, glass, antimony oxides, etc.; examples of organic fillers include the various polymers and copolymers of vinyl chloride, vinyl acetate, acrylonitrile, styrene, melamine, partially oxyalkylated melamine, etc. Organic esters can also be used. Particularly preferred esters are those derived from dicarboxylic acids, such as oxalic, malonic, succinic, glutaric, maleic, phthalic, isophthalic and terephthalic acids.

For example, a fire retardant, such as those containing bromine, chlorine or phosphorus, can be incorporated into the mixture to impart fire resistance. Other commonly used additives are hydroxyl-containing compositions, such as castor oil, aromatic polyesters, glycols and/or alkoxylated sorbitols, acid scavengers (for example, α-methyl styrene), acid formation inhibitors or diluents.

C. Forming the Foam

Component A and component B can be mixed, such as through a static mix, high pressure mix or impingement mix chamber or any other device commonly known in the industry, by standard procedures to produce a homogenous blend. In a preferred embodiment, a one-shot method of foam fabrication is used, whereby the isocyanate containing stream (component A) and the polyol-containing and catalyst-containing stream (component B) are mixed. Each of these streams is preferably liquid in which all of the various additives are preferably soluble, although dispersions utilizing solid components can be used as desired.

Preferably component A and component B are mixed such that there is about 0.3 to about 1.2 polyol equivalents per equivalent polyisocyanate. "Polyol equivalent" means the weight component B used in the foam divided by the equivalent weight of component B. "Polyisocyanate equivalent" means the weight component A used in the foam divided by the equivalent weight of component A.

EXAMPLES

Without further elaboration, it is believed that one skilled in the art can, using the preceding description, us the present invention to its fullest extent. The following examples are offered by way of illustration and not by way of limiting the remaining disclosure.

Example 1

Reactivity can be measured and then compared to the profile of the chemical product information sheet for each chemical system. The reactivities can be determined using the String-Gel time and Tack-Free time.

String-Gel

String-Gel is the measure of time from the beginning of the shot until the foam adheres to a thin wire (approx. 1/16" in diameter) and becomes "stringy"-something like bubble gum.

String-Gel measurements are made as follows:
1. Take a 10-second shot into a 30-gallon plastic bag and simultaneously start the stopwatch.
2. At about 60-seconds, poke a wire into the rising chemical at least 12 inches deep and take it out again. Repeat poking wire in and out of the rising chemical at 5-second intervals until the foam sticks to the wire and forms a bubble gum-like string. Do not poke the same place twice.
3. Record time the String-Gel took place.

Tongue depressors or Popsicle sticks should not be used for String-Gel because they do not go deep enough into the rising foam. A wire similar to a coat hanger is suitable.

Tack-Free

Tack-Free is the measure of time from the beginning of the shot until the foam becomes "tack-free" or does not stick to fingertip when touched tightly.

A Tack-Free measurement may be made as follows:
1. Follow Step 1-3 for String-Gel.
2. Measure from the start of the shot until foam becomes "tack-free" or no longer sticks to the fingertip when touched lightly.
3. Record the time.

String-Gel and Tack-Free times can be recorded from the same shot if the String-Get is observed first and Tack-Free is further observed. It is important to keep the plastic bag off cold floors because it will affect the reactivity times.

Reactivity of an amine catalyst using methyl formate as a blowing agent, with and without formic acid added, was determined. Foams were blown 0, 1, 2, 3 and 4 weeks after formulating component B with and without acid. The times of gel reactivity were assayed as described above, and the data plotted. The data are expressed as time of gel reactivity (Table 4 and FIG. 1a) and % change of reactivity compared to the baseline of 0 weeks (Table 5 and FIG. 1b).

TABLE 3

Results of gel reactivity over time in foams formed with and without acid

| Time (weeks) | AA*-blown foam no acid (seconds) | AA*-blown foam with acid (seconds) |
|---|---|---|
| 0 | 78 | 80 |
| 1 | 92 | 80 |
| 2 | 100 | 79 |
| 3 | 106 | 78 |
| 4 | 112 | 79 |

*AA, alkyl alkanoate

Figure 1B:
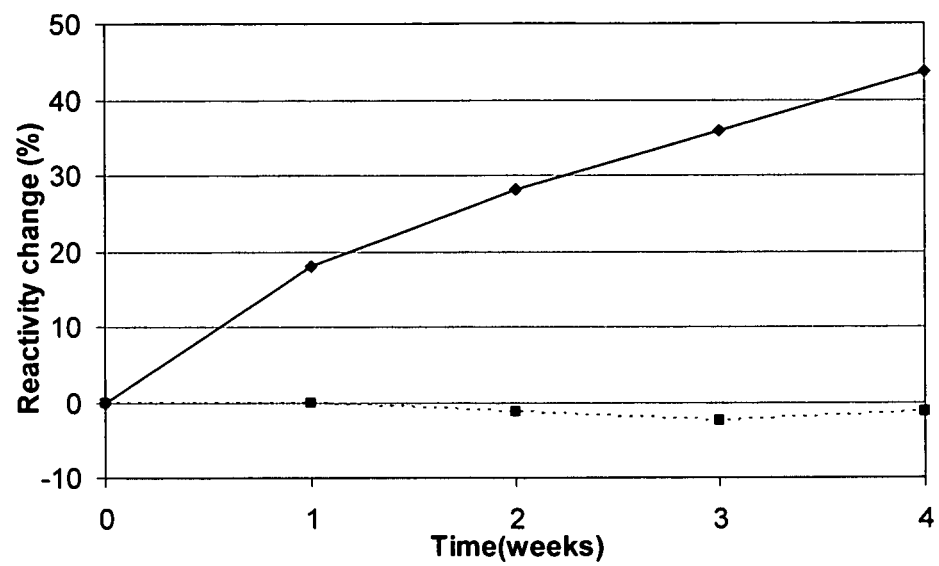
FIG. 1b shows the reactivity change observed in the experiments of FIG. 1a, expressed as percent change in reactivity.

As shown in FIG. 1a and Table 4, when the acid is not present, the gel reactivity declines over time, so that at 4 weeks after formulating component B, gel reactivity requires 20 more seconds than at baseline (FIG. 1a, diamonds). However, when formic acid is present, reactivity does not decline, remaining at 78-80 seconds (FIG. 1a, squares). FIG. 1b and Table 5 report these results as percentage of change from baseline, reinforcing the dramatic effect acid has upon protecting the amine catalyst from reactivity drift and degradation. The percent of reactivity change reaches 45% at 4 weeks when acid is not present (FIG. 1b, diamonds), while that for the component containing acid marginally fluctuates, with a range of −2.5% to 0% (FIG. 1b, squares).

TABLE 4

Percent (%) change of gel reactivity over time in foams formed with and without acid

| Time (weeks) | AA*-blown foam no acid (%) | AA*-blown foam with acid (%) |
|---|---|---|
| 0 | 0 | 0 |
| 1 | 17.9 | 0 |
| 2 | 28.2 | −1.25 |
| 3 | 35.9 | −2.5 |
| 4 | 43.6 | −1.25 |

*AA, alkyl alkanoate

Other Embodiments

The detailed description set forth above is provided to aid those skilled in the art in practicing the present invention. However, the invention described and claimed herein is not to be limited in scope by the specific embodiments herein disclosed because these embodiments are intended as illustration of several aspects of the invention. Any equivalent embodiments are intended to be within the scope of this invention. Indeed, various modifications of the invention in addition to those shown and described herein will become apparent to those skilled in the art from the foregoing description which do not depart from the spirit or scope of the present inventive discovery. Such modifications are also intended to fall within the scope of the appended claims.

REFERENCES

All publications, patents, patent applications and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present invention.

Bailey, D. L., and F. M. O'Connor. 1958. U.S. Pat. No. 2,834,748. Siloxane-oxyalkylene block copolymers.

Ferrigno, T. H. 1963. Rigid plastic foams. Reinhold Pub. Corp., New York, x, 276 p. pp.

Kalinowski, T. T., D. G. Keske, V. Matimba, et al. 2004. U.S. Pat. No. 6,753,357. Rigid foam compositions and method employing methyl formate as a blowing agent.

Keske, D. G., and M. S. Schulte. 1991. U.S. Pat. No. 5,032,623. Rigid foams using CHCLF2 as a blowing agent.

Keske, D. G., and M. S. Schulte. 1993a. U.S. Pat. No. 5,274,007. Rigid foams using $CHCLF_2$ as a blowing agent.

Keske, D. G., and M. S. Schulte. 1993b. U.S. Pat. No. 5,194,175. Rigid foams, methods of preparation thereof and compositions useful in methods and preparations thereof.

What is claimed is:

1. A method of preparing a composition for making a rigid polyurethane foam, comprising combining:
    at least one catalyst selected from amine catalysts that have catalytic activity between an isocyanate group and an active hydrogen containing group;
    at least one alkyl alkanoate blowing agent;
    at least one acid selected and present in an amount sufficient for the activity of the amine catalyst to be reduced 0% for at least one week; and
    a polyol component comprising at least one polyol, wherein the polyol component has a hydroxyl number average of from about 300 to 500 for a rigid foam.

2. The method of claim 1, wherein the catalyst is added independently of the acid.

3. The method of claim 1, wherein the acid comprises an organic acid.

4. The method of claim 3, wherein the organic acid comprises formic acid.

5. The method of claim 1, wherein the acid is present, by weight, from 1% to 500% of the molar equivalent of the amine catalyst.

6. The method of claim 1, wherein the acid is present, by weight, from 10% to 400% of the molar equivalent of the amine catalyst.

7. The method of claim 1, wherein the acid is present, by weight, from 50% to 300% of the molar equivalent of the amine catalyst.

8. The method of claim 1, wherein the at least one polyol is a polyoxylated polyol.

9. The method of claim 1, wherein the at least one polyol is a polyoxylated polyol selected from the group consisting of polyalkoxylated polyol, polypropoxylated polyol, and polybutoxylated polyol.

10. The method of claim 1, wherein the at least one polyol is selected from the group consisting of polyoxylated aliphatic amine, Mannich polyol, polyalkoxylated sucrose, glycerin, a transesterification of a terephtalate, and a transesterification of a castor oil.

11. The method of claim 1, wherein the alkyl alkanoate blowing agent is methyl formate.

12. The method of claim 1, wherein the composition further comprises a surfactant.

* * * * *